(12) United States Patent
Dyckman et al.

(10) Patent No.: US 6,436,360 B1
(45) Date of Patent: Aug. 20, 2002

(54) METHOD OF CLEANING INDUSTRIAL WASTE GASES

(75) Inventors: Arkady Samuilovich Dyckman, St. Petersburg (RU); John William Fulmer; Bradley Norman Geyer, both of Mt. Vernon, IN (US); William Dale Kight, Poseyville, IN (US); Vladimir Yevgenyevich Pastor; Andrey Vladimirovich Zinenkov, both of St. Petersburg (RU)

(73) Assignee: General Electric Company, Schenectady, NY (US)

(*) Notice: Subject to any disclaimer, the term of this patent is extended or adjusted under 35 U.S.C. 154(b) by 90 days.

(21) Appl. No.: 09/703,741

(22) Filed: Nov. 1, 2000

(30) Foreign Application Priority Data

Nov. 24, 1999 (RU) .......................................... 99124383

(51) Int. Cl.[7] ................ B01J 8/00; B01J 8/04
(52) U.S. Cl. .................. 423/245.1; 423/245.3
(58) Field of Search .......................... 423/245.1, 245.3; 588/205

(56) References Cited

U.S. PATENT DOCUMENTS

| | | | |
|---|---|---|---|
| 3,384,659 A | 5/1968 | Bate | |
| 4,238,417 A | * 12/1980 | Austin et al. ................ | 423/293 |
| 4,322,567 A | * 3/1982 | Matsunaga et al. ......... | 568/798 |
| 4,450,244 A | 5/1984 | Domesle et al. | |
| 4,518,805 A | * 5/1985 | Abatjoglou et al. ........ | 568/444 |
| 4,673,556 A | 6/1987 | McCabe et al. | |
| 4,673,558 A | 6/1987 | Senoue et al. | |
| 4,716,859 A | 1/1988 | König et al. | |
| 4,919,903 A | 4/1990 | Gandhi et al. | |
| 4,919,930 A | 4/1990 | Beachey et al. | |
| 5,009,872 A | 4/1991 | Chuang et al. | |
| 5,134,103 A | * 7/1992 | Lowery et al. ............. | 502/340 |
| 5,292,991 A | 3/1994 | Lachman et al. | |
| 5,585,083 A | 12/1996 | Kielin et al. | |
| 5,653,949 A | 8/1997 | Chen et al. | |
| 5,702,836 A | 12/1997 | Ma et al. | |
| 6,096,278 A | 1/2000 | Gary | |

FOREIGN PATENT DOCUMENTS

| | | | |
|---|---|---|---|
| EP | 0 888 807 A | 1/1999 | |
| GB | 2 065 629 A | 7/1981 | |
| JP | 61-130249 A | * 6/1986 | ........... C07C/33/18 |
| RO | 88186 | 2/1986 | |
| RU | 2050976 | 10/1996 | |
| RU | 2085265 | 3/1998 | |
| SU | 16956431 | 8/1997 | |

OTHER PUBLICATIONS

PCT International Search Report for International application No. PCT/US 00/31251, International filing date Sep. 11, 2000.

* cited by examiner

Primary Examiner—Steven P. Griffin
Assistant Examiner—Eileen E. Nave

(57) ABSTRACT

This invention concerns the field of environmental protection and can be used to clean industrial waste gases containing products that cause resin formation which fouls catalysts. It is proposed to clean industrial waste gases of aromatic and aliphatic compounds at 120–160° C. by means of passing waste gases first through a catalytic composition consisting of a guard bed (to protect the palladium catalyst) with a specific surface 0.2–1.0 $m^2 \cdot g^{-1}$, which is initially roasted at 800–1,350° C. and second through a palladium catalyst bed (0.1–3% palladium, deposited on an active aluminum oxide). The proposed method makes it possible to clean industrial waste gases of harmful substances (for example, methanol, cumene) with a degree of destruction not less than 97–98% in the presence of aromatic hydroperoxides which cause resin formation and catalyst fouling on other catalytic systems.

6 Claims, No Drawings

METHOD OF CLEANING INDUSTRIAL WASTE GASES

The present application is a U.S. non-provisional application based upon and claiming priority from Russian Application No. 99124383 which is hereby incorporated by reference.

The invention provides a method for removing volatile organic chemicals from waste gas streams produced as a byproduct in the manufacture of phenol. Specifically, the invention provides a method for removing methanol and cumene from a waste gas stream while avoiding catalyst deactivation by phenol tar formation.

If waste gases contain small quantities of organic impurities, strictly isothermal operating conditions are used in removing the impurities. Implementation of such methods involves adding significant quantities of heat to the reaction mass. Various catalytic systems are used as industrial catalysts for removing organic impurities from waste gases. Some contain the oxides of base metals, for example chromium, cobalt, zirconium (Russian patent No. 2050976), magnesium (U.S. Pat. No. 4,673,558), manganese, copper (Russian Patent Application No. 95102026). Other catalysts contain noble metals, for example platinum (U.S. Pat. No. 5,702,836), palladium, and silver (U.S. Pat. No. 4,673,556). Recently, catalytic systems comprising noble metals on complex oxide carriers have become widespread (U.S. Pat. No. 5,585,083), in particular group VIII metals on titanium and cerium oxides (U.S. Pat. No. 4,716,859), or, for example, palladium and rhodium on cerium oxides (U.S. Pat. No. 4,919,903).

The most universal method of cleaning waste gases of $C_3$ hydrocarbons and oxygen-containing compounds (including inorganic ones) is disclosed in U.S. Pat. No. 5,292,991, which describes a process carried out at a temperature of 600° C. in the presence of a catalyst comprising platinum and palladium jointly deposited onto zeolite ZSM type modified by zirconium and titanium oxides. This process achieves a conversion of hydrocarbon of 98.1%. The disadvantage of this method is the necessity of heating streams of steam and gas, which, as a rule, are rich in nitrogen and steam, to a high temperature. Also, this method is only effective for cleaning the streams of light hydrocarbons which do not cause resinification of the catalyst.

Catalytic compositions containing noble metals have been developed to treat specific organic compounds. For example, a known low-temperature method according to U.S. Pat. No. 5,653,949, for cleaning waste gases of organobromine compounds uses a catalyst containing metals of the platinum group on oxides of zirconium, manganese, cerium, and cobalt recommends using a palladium/rhodium catalyst on cerium oxide to reduce the temperature to which the gas stream is heated when it is cleaned of methanol and formaldehyde. This method makes it possible to reduce the reaction temperature to 150° C. The disadvantage of this method is that it can only remove methanol and formaldehyde from waste gases. Therefore, if the gas stream contains aromatic hydroperoxides, which cause resinification of the catalyst, this method is not effective.

U.S. Pat. No. 5,009,872, describes a method for cleaning industrial waste gases which contain aldehydes, alcohols, and ketones with up to 5 carbon atoms at a low temperature (not greater than 150° C.) using a catalytic system comprising up to 22% of at least two noble metals supported on a special hydrophobic carrier. This method cleans the waste stream of 90% of its ethanol and 93% of its formaldehyde. The disadvantage of this method is that again, it is only possible to clean waste gases of small organic compounds, whose presence does not cause the resinification of the catalyst (e.g., methanol, ethanol, acetone, and formaldehyde).

The method of cleaning waste gases of oxygen-containing organic compounds which is closest to the proposed method involves passing waste gases over a catalyst which is 0.03–3.0% palladium, deposited onto a carrier which includes aluminum oxide. This method is described in U.S. Pat. No. 4,450,244. According to U.S. Pat. No. 4,450,244, the process is carried out in the presence of oxygen at an elevated temperature (i.e., 350 or 400° C.), which ensures the cleaning of various organic oxygen-containing compounds to the level of 88–96% at 350° C., and to the level of 98–100% at 400° C. The advantage of this method is the lower content of noble metals compared with catalysts described in some of the preceding patents and the higher degree of cleaning of organic oxygen-containing compounds which it provides. The disadvantages of this method are: 1) the necessity of heating the gas stream to a high temperature, and 2) the inability to clean the gas stream of the indicated compounds in the presence of organic hydroperoxides as a consequence of resinification of the catalyst.

In view of the above, the task was to develop an efficient method for cleaning industrial waste gases, including oxygen-containing compounds, among which are aromatic hydroperoxides.

The guard bed described herein was used earlier for thermal decomposition of 1) side products which form during the synthesis of 4,4-dimethyl-1,3-dioxane (DMD), and of 2) the pyran fraction obtained in the decomposition of DMD in the process of synthesizing isoprene from formaldehyde and isobutylene (Russian Patent 1695631, and Romanian Patent 88186, of May 14, 1983). In these patents, the products undergoing thermal decomposition consist of compounds of the pyran and dioxane type, whose properties differ greatly from those of the aromatic hydroperoxides found in waste gases.

SUMMARY OF THE INVENTION

In order to simplify the technology of the process by reducing the cleaning temperature of the waste gases, including aromatic hydroperoxides, cumene, and also formic acid, it is proposed to carry out the process as described below.

The waste gas described herein comprises an aromatic hydroperoxide impurity (e.g., cumene hydroperoxide). A typical waste gas comprises cumene, cumene hydroperoxide, methanol and formic acid.

To remove impurities, the waste gas is first passed through a guard bed and second passed through a palladium catalyst. The guard bed protects the palladium catalyst be decomposing organic impurities which could lead to inactivation of the palladium catalyst due to tar formation. This makes the process feasible because the palladium catalyst is expensive and can not be replaced often in an economical process.

The guard bed has a surface area of 0.2–1.0 $m^2g^{-1}$ and is roasted at a temperature of 800–1,350° C. before use. After roasting, the guard bed contains oxides of aluminum, iron (II), magnesium, calcium, potassium, sodium, titanium (IV), and silicon, which have the following mass ratios (%):

| | |
|---|---|
| Aluminum oxide | 5.0–30.0 |
| Iron (II) oxide | 0.1–5.0 |
| Magnesium oxide | 0.1–5.0 |
| Calcium oxide | 0.1–5.0 |
| Potassium oxide | 0.1–3.0 |
| Sodium oxide | 0.1–3.0 |
| Titanium (IV) oxide | 0.1–3.0 |
| Silicon oxide | (the remainder). |

The palladium catalyst contains 0.1 to 3% palladium supported on active aluminum oxide. A preferred catalyst of this type is Sud Chemie T-2864F catalyst comprising 0.7 wt. % palladium on alumin on 1/20" extrudates, in pre-reduced state, at a bulk density of 35 lb./ft$^3$.

In a preferred embodiment of the invention, the weight ratio of the guard bed to a palladium bed catalysts is from 0.5:1 to 2:1.

The process is preferably conducted maintaining the temperature at 120 to 160° C. at both catalysts.

In operation, the waste gas is first passed through the guard bed with oxygen present. Next, the waste gas is passed through the palladium catalyst. In the case of waste gases containing formic acid, the guard bed is though to remove the formic acid, thereby avoiding formation of tar on the palladium bed. The palladium bed if effective to remove cumene hydroperoxide.

The proposed method makes it possible to clean industrial waste gases of harmful substances (for example, methanol, cumene), with the degree of their destruction not falling below 97–98%, in the presence of compounds (for example, aromatic hydroperoxides), which cause resin formation on other catalytic compositions.

The industrial applicability of the proposed method is illustrated by the following examples:

EXAMPLE 1

A glass reaction vessel with a cross section of 2.26 cm$^2$ has the following placed in it in succession: 12 ml of a catalyst containing 0.1% of palladium on aluminum oxide, and 6 ml of a guard bed consisting of (mass %): aluminum oxide 22.4, iron (II) oxide 0.42, magnesium oxide 0.43, calcium oxide 0.67, potassium oxide 2.4, sodium oxide 1.2, titanium (IV) oxide 0.47, with the remainder being silicon oxide. The guard bed is initially roasted at a temperature of 800° and its specific surface area is 1 m$^2 \cdot$g$^{-1}$. The reaction vessel is heated by an electric furnace which uniformly heats both layers along the height of the reaction vessel the reaction temperature is 120±1° C. The stream of steam and gas is fed into the reaction vessel at a speed of 63.0l·h$^{-1}$. The composition of the stream (volume %) is: nitrogen 91.0, oxygen 6.0, steam 3.0, methanol 0.02, formic acid 0.002, cumene 0.002, and cumene hydroperoxide 0.002. The volume feed rate of the stream to be cleaned is 3,500h$^{-1}$. After 500 hours of operation of the catalyst an experiment is conducted over the course of 4 hours. During this time the following (volume %) are fed in with the stream of steam and gas (g): methanol 0.06720, formic acid 0.00966, cumene 0.02520, cumene hydroperoxide 0.03196. The reaction products are directed to a system consisting of four traps (absorbers) connected in series, cooled by a mixture of carbon dioxide and acetone (temperature −70° C. to −8° C.). The first and last traps are empty, and the second and third are filled with n-butanol. After the experiment is completed, the content of the reaction products is determined by gas-liquid chromatography (GLC). The total quantity of products in the absorbers in this experiment is (g): methanol 0.00100, formic acid 0.00000, cumene 0.00008, and cumene hydroperoxide 0.00510, which corresponds to conversion of substances (by %) of: methanol 98.5, formic acid 100, cumene 99.7, and cumene hydroperoxide 84.4. When the catalyst was unloaded, no resinification was found.

EXAMPLE 2

The reaction vessel described in Example 1 is loaded with 3 ml of a catalyst containing 3.0% of palladium on aluminum oxide and more than 6 ml of the guard bed described in example 1, but heated at a temperature of 1,350° C. Its specific surface is 0.2 m$^2 \cdot$g$^{-1}$. The reaction temperature in both layers is maintained at 160±1° C. The reaction vessel has a stream of steam and gas fed into it at a rate of 90l·h$^{-1}$. The composition of the stream is (volume %): nitrogen 91.0, oxygen 6.0, steam 3.0, methanol 0.04, formic acid 0.002, cumene 0.01, and cumene hydroperoxide 0.01. The volume feed rate of the stream being cleaned is 10,000h$^{-1}$. During the four-hour equilibrium experiment conducted after 500 hours of operation of the catalyst, the following are fed in (g): methanol 0.192, formic acid 0.013, cumene 0.1803, and cumene hydroperoxide 0.2283. The total content of products in the absorbers in this experiment is (g): methanol 0.00173, formic acid 0.0000, cumene 0.0011, and cumene hydroperoxide 0.00730, which corresponds to a conversion of substances of (%): methanol 99.1, formic acid 100, cumene 99.4, and cumene hydroperoxides 96.9. When the catalyst was unloaded no resinification was found.

EXAMPLE 3

(For Comparison)

The reaction vessel described in Example 1 is loaded with 12 ml of a catalyst containing 3.0% of palladium on aluminum oxide. The guard bed is not loaded into the reaction vessel. The stream of steam and gas described in Example 1 is fed in at a rate of 24l·h$^{-1}$. The reaction temperature is 160±1° C. The volume feed rate of the stream being cleaned is 2,000h$^{-1}$. During the time of the four-hour equilibrium experiment which was conducted after 75 hours of operation of the catalyst, the following is fed in (g): methanol 0.0256, formic acid 0.00368, cumene 0.009616, and cumene hydroperoxide 0.01218. The total content of products in the absorbers in this experiment is (g): methanol 0.014, formic acid 0.000, cumene 0.00377, and cumene hydroperoxide 0.00509, which corresponds to a conversion of the substances of (%): methanol 45.3, formic acid 100, cumene 60.8, and cumene hydroperoxide 58.2. When the palladium catalyst was unloaded, it was found that more than half of it was covered with resinous products.

EXAMPLE 4

(For Comparison)

The reaction vessel described in Example 1 is loaded with 12 ml of the guard bed prepared as in Example 2. The palladium-containing catalyst is not loaded into the reaction vessel. The stream of steam and gas described in Example 1 is fed into the reaction vessel at a rate of 90l·h$^{-1}$. The reaction temperature is 160±1° C. The volume feed rate of the stream being cleaned is 7,500 1·h$^{-1}$. During the time of the four-hour equilibrium experiment which was conducted after 500 hours of operation of the catalyst, the following is fed in (g): methanol 0.192, formic acid 0.0138, cumene 0.1803, and cumene hydroperoxide 0.2283. The total content of products in the absorbers in this experiment is (g): methanol 0.162, formic acid 0.000, cumene 0.1554, and cumene hydroperoxides 0.2011, which corresponds to a conversion of the substances of (%): methanol 15.6, formic acid 100, cumene 13.8, and cumene hydroperoxides 11.9.

The data of Examples 1–4 is summarized in the Table.

Analysis of the data in the Table shows that the use of a catalytic composition together with a guard bed having a specific surface of 0.2–1.0m$^2$g$^{-1}$, which is roasted at a temperature of 800–1,350° C. and a palladium catalyst with a metal content of 0.1–3% effectively cleans a stream of steam and gas in the presence of oxygen at a volume rate of flow of 3,500–10,000 1·h$^{-1}$ and a reaction temperature of 120–160° C. for more than 500 hours. Resinification of the catalyst is not observed. In the absence of a guard bed even with increased palladium content (3%), with a reduced volume rate of flow (2,000 1·h$^{-1}$), and with an increased reaction temperature (160° C.), the catalyst already resinifies after 75 hours of operation, and its effectiveness at cleaning the stream of organic compounds is significantly reduced. In the absence of the palladium catalyst even after a long run (500 hours) resinification of the guard bed does not occur. However, the conversion of harmful organic substances is insignificant, and no cleaning of the gas flow takes place.

TABLE

| Example nos. | Reaction vessel charge | | | Reaction conditions | | Conversion (%) | | | | Resinification of catalyst |
|---|---|---|---|---|---|---|---|---|---|---|
| | Catalyst I | Catalyst II | Volume ratio I:II | Reaction temperature (° C.) | Length of operation of catalyst (h) | Methanol | Formic acid | Cumene | Cumene hydroperoxide | |
| 1 | Guard Bed | 0.1% Pd | 0.5:1 | 120 | 500 | 98.5 | 100 | 99.7 | 84.4 | no |
| 2 | Guard Bed | 3.0% Pd | 2:1 | 160 | 500 | 99.1 | 100 | 99.4 | 96.9 | no |
| 3 (for comparison) | none | 3.0% Pd | none | 160 | 75 | 45.3 | 100 | 60.8 | 58.2 | yes |
| 4 (for comparison) | Guard Bed | none | none | 160 | 500 | 15.6 | 100 | 13.8 | 11.9 | no |

Notes:
1. Roasting temperature 800° C.; specific surface 1 m² · g⁻¹.
2. Roasting temperature 1,350° C.; specific surface 0.2 m² · g⁻¹.

What is claimed is:

1. A method for removing organic compounds from industrial waste gas, which method comprises first passing a waste gas comprising aromatic hydroperoxide impurities through a guard bed in the presence of oxygen, and second passing the waste gas through a palladium catalyst bed comprising 0.1 to 3 weight percent palladium supported on an activated aluminum oxide carrier, wherein the waste gas is maintained at a temperature of 120 to 160° C.

2. The method according to claim 1, where the guard bed is roasted at 800–1,350° C. before use.

3. The method according to claim 2, wherein the guard bed has a specific surface area of 0.2 to 1.0 $m^2 g^{-1}$.

4. The method according to claim 1, wherein the weight ratio of the guard bed to the palladium catalyst bed is from 0.5:1 to 2:1.

5. The method according to claim 3, wherein the guard bed has a mass composition of:
   aluminum oxide 5.0–30.0%,
   iron (II) oxide 0.1–5.0%,
   magnesium oxide 0.1–5.0%,
   calcium oxide 0.1–5.0%,
   potassium oxide 0.1–3.0%,
   sodium oxide 0.1–3.0%,
   titanium (IV) oxide 0.1–3.0%, and the remainder is silicon oxide.

6. The method according to claim 1, wherein the industrial waste gas comprises cumene, cumene hydroperoxide methanol and formic acid.

* * * * *